United States Patent
Motosugi et al.

(10) Patent No.: US 11,825,190 B2
(45) Date of Patent: Nov. 21, 2023

(54) COLLATION DEVICE

(71) Applicant: FUJIFILM Business Innovation Corp., Tokyo (JP)

(72) Inventors: Yukari Motosugi, Kanagawa (JP); Ken Sato, Kanagawa (JP); Masaki Kyojima, Kanagawa (JP); Minoru Oshima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 8 days.

(21) Appl. No.: 17/586,799

(22) Filed: Jan. 28, 2022

(65) Prior Publication Data
US 2023/0098952 A1 Mar. 30, 2023

(30) Foreign Application Priority Data
Sep. 24, 2021 (JP) .................................. 2021-155853

(51) Int. Cl.
*H04N 23/60* (2023.01)
*H04N 23/63* (2023.01)
*G06K 7/015* (2006.01)
*H04N 23/80* (2023.01)
*H04N 23/56* (2023.01)
(Continued)

(52) U.S. Cl.
CPC ............. *H04N 23/64* (2023.01); *G06K 7/015* (2013.01); *G06K 19/06037* (2013.01); *H04N 9/64* (2013.01); *H04N 23/56* (2023.01); *H04N 23/633* (2023.01); *H04N 23/80* (2023.01)

(58) Field of Classification Search
CPC .......... H04N 23/64; H04N 9/64; H04N 23/56; H04N 23/633; H04N 23/80; G06K 7/015; G06K 19/06037; G06V 10/145; G06V 10/225; G06V 20/95; G06V 30/142; G06V 30/418; G07D 7/00; G07D 7/003; G07D 7/20
See application file for complete search history.

(56) References Cited

U.S. PATENT DOCUMENTS 9,720,305 B2  8/2017  Ishiyama
10,805,523 B2 * 10/2020 Lau ........................ H04N 23/63
(Continued)

FOREIGN PATENT DOCUMENTS

EP   2956915   12/2018
JP   6119751   4/2017
(Continued)

OTHER PUBLICATIONS

"Search Report of Europe Counterpart Application", dated Sep. 2, 2022, p. 1-p. 8.
(Continued)

*Primary Examiner* — Tuyen K Vo
(74) *Attorney, Agent, or Firm* — JCIPRNET

(57) ABSTRACT

A collation device includes a light source unit; a camera unit that receives light emitted from the light source unit and reflected in a collation area of an object to acquire a photographed image of the collation area; a display unit; and a processor configured to, by executing a program: display a guide of a bright spot portion of the light source unit on the photographed image on the display unit so that an angle formed by the light source unit, the camera unit, and the collation area of the object is a predetermined angle.

15 Claims, 15 Drawing Sheets

(51) Int. Cl.
　　　*G06K 19/06*　　　(2006.01)
　　　*H04N 9/64*　　　(2023.01)

(56) References Cited

U.S. PATENT DOCUMENTS

| | | | |
|---|---|---|---|
| 11,265,428 B2 * | 3/2022 | Tokuchi | ............... G06F 3/1204 |
| 2020/0316979 A1 | 10/2020 | Bud et al. | |

FOREIGN PATENT DOCUMENTS

| | | |
|---|---|---|
| JP | 2020043490 | 3/2020 |
| JP | 2021047448 | 3/2021 |
| KR | 20150071063 | 6/2015 |

OTHER PUBLICATIONS

"Office Action of Europe Counterpart Application", dated Apr. 21, 2023, p. 1-p. 6.
"Office Action of Europe Counterpart Application", dated Sep. 7, 2023, p. 1-p. 8.
Andreas Hartl; et al., "Mobile interactive hologram verification," 2013 IEEE International Symposium on Mixed and Augmented Reality (ISMAR), Oct. 2013, pp. 75-82.

\* cited by examiner

COLLATION DEVICE

CROSS-REFERENCE TO RELATED APPLICATIONS

This application is based on and claims priority under 35 USC 119 from Japanese Patent Application No. 2021-155853 filed Sep. 24, 2021.

BACKGROUND

(i) Technical Field

The present invention relates to a collation device.

(ii) Related Art

JP6119751B discloses a photographing assisting tool that assists in photographing a predetermined area of a surface of an object having fine unevenness and strong specular reflection, and includes a light source unit that emits light, and a cover portion that has a shape that covers the predetermined area on the surface of the object, and in which a part of a surface corresponding to a predetermined angle range from a normal direction facing the predetermined area is a black background and a surface corresponding to the other angle range is a light source area surface that diffuses light emitted from the light source unit, in which the cover portion has an upper surface portion facing the surface of the object and a side surface portion connected to the upper surface portion between the surface of the object and the upper surface portion, the light source unit is provided on an upper surface portion side of the side surface portion of the cover portion, and the black background area of the cover portion is provided on an inner surface of the upper surface portion based on the predetermined angle range centered on a normal line of the surface of the object.

JP2021-47448A discloses a photographing system that acquires a photographed image in which the same feature point can be stably extracted by using a camera of a mobile terminal and includes an acquisition unit that acquires an image including a pattern randomly formed on an object surface and a control unit that superimposes and displays a transparent image of the image acquired by the acquisition unit on a live view image displayed on a display unit in a case where a collation object is photographed by the camera unit.

JP2020-43490A discloses a technology that can determine a reading area and a light irradiation direction in a case of acquiring surface information of an inspection object in a case of acquiring the surface information of the inspection object and collating the surface information with surface information registered in advance. A first mark and a second mark are printed and formed at predetermined positions of the inspection object. The first mark indicates the reading area, and the second mark indicates the light irradiation direction. It is disclosed that the reading area and the light irradiation direction are matched between the time of registration and the time of collation of the surface information by using the first mark and the second mark.

SUMMARY

In a case where a user photographs a collation area by using a mobile terminal and collates the image with a registered image, for example, it is desirable that an angle formed by a light source unit of a mobile terminal, a camera unit, and the collation area at the time of photographing is an appropriate angle with respect to an angle in a case where the registered image is acquired.

Aspects of non-limiting embodiments of the present disclosure relate to a collation device that provides a technology that allows a user to easily recognize whether or not an angle formed by a light source unit, a camera unit, and a collation area is appropriate in a case where photographing the collation area.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a collation device including a light source unit; a camera unit that receives light emitted from the light source unit and reflected in a collation area of an object to acquire a photographed image of the collation area; a display unit; and a processor configured to, by executing a program: display a guide of a bright spot portion of the light source unit on the photographed image on the display unit so that an angle formed by the light source unit, the camera unit, and the collation area of the object is a predetermined angle.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described with reference to the drawings. An individual identification system that uniquely identifies an object by photographing a surface image of the object and performing image collation between a registered image and a collation image will be described as an example.

The individual identification system has a technology that registers an image of a part of a surface of an object, specifically about 0.1 to several mm in advance as information unique to the object and uniquely identifies that the object collated is the same as a registered object, that is, the object is genuine, and the information unique to the object is, for example, a random pattern by a fine pattern. A satin pattern is a specific example of the random pattern by the fine pattern. The satin pattern is not limited to one obtained by surface treatment such as frosted glass, and has a concept that includes not only the satin pattern applied by treatment processing to metal, synthetic resin (plastic or the like), or the like, but also a wrinkle pattern obtained by embossing treatment and randomly woven fiber pattern, a random fine dot pattern by printing, a random particle distribution by printing with ink containing glitter particles, and unevenness formed on sandblasted glass surface or the like. Further, the satin pattern includes not only an unintentionally formed satin pattern but also an intentionally formed satin pattern for identification or collation. In short, the satin pattern is a random pattern that is difficult to control and form. It may be said to be a kind of "artifact metrics" that optically reads such a random pattern and uses the random pattern as information.

Here, a case is assumed in which a printing substrate having unevenness such as a hologram and paper is used as a printing substrate and an ink portion in which metal particles are dispersed is printed on the printing substrate having such unevenness to form a random pattern.

Figure 1:
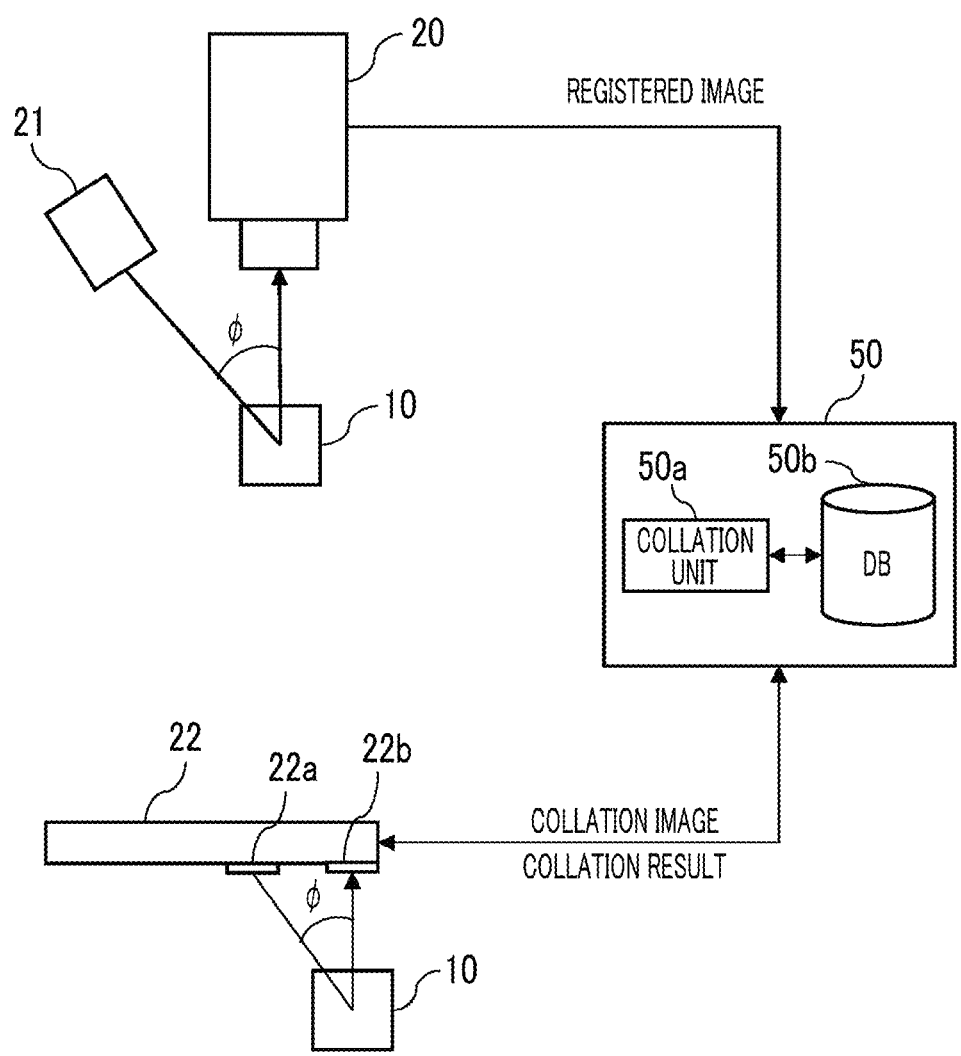
FIG. 1 is a system configuration diagram of an exemplary embodiment.

FIG. 1 shows a system configuration of the present exemplary embodiment. The collation system includes a registered image photographing machine 20, a collation image photographing machine 22, and a server computer 50. The registered image photographing machine 20 and the server computer 50, and the collation image photographing machine 22 and the server computer 50 are connected to each other by a communication network.

An object 10 is irradiated with a light source unit 21 such as an LED, and the light reflected from the object 10 is photographed by the registered image photographing machine 20 to acquire a registered image. The registered image photographing machine 20 and the light source unit 22a can be composed of dedicated equipment for registration.

An irradiation angle φ of the irradiation light from the light source unit 21 is set to a certain fixed angle. The acquired registered image is transmitted to the server computer 50 and stored in a registered image DB 50b in the server computer 50.

On the other hand, the object 10 is photographed by using a mobile terminal such as a smartphone held by the user of the collation system as the collation image photographing machine 22. The object 10 is irradiated with a light source unit 22a such as an LED mounted on a smartphone or the like, and the light reflected from the object 10 is photographed by the camera unit 22b mounted on the smartphone or the like. An irradiation angle φ of the irradiation light from the light source unit 22a is set to be substantially the same as an angle φ which is the condition in a case where the registered image is acquired. The reason is that, as described above, the random pattern of the ink portion changes depending on an irradiation direction of light, so that it is necessary to set a positional relationship between the light source unit 22a, the camera unit 22b, and the object 10 to be substantially the same as a positional relationship at the time of photographing the registered image 16.

A processor of the collation image photographing machine 22 performs series of processing on the photographed image to extract the ink portion from the photographed image, further cuts out the collation image as a collation area from the area of the ink portion, and transmits the collation image to the server computer 50 via the communication network. The processing of the processor of the collation image photographing machine 22 will be further described later.

The server computer 50 includes a collation unit 50a and the registered image DB 50b.

The registered image DB 50b is composed of a storage device such as a hard disk or a solid state drive (SSD), and stores an identifier ID for uniquely specifying the object 10 and the registered image in association with each other.

The collation unit 50a is composed of a processor, and stores the registered image received from the registered image photographing machine 20 in the registered image DB 50b in association with the ID of the object 10. Further, the collation unit 50a performs image collation between the collation image received from the collation image photographing machine 22 and the registered image stored in the registered image DB 50b, and outputs the collation result to the collation image photographing machine 22. Specifically, the collation unit 50a reads the registered image from the registered image DB 50b, performs collation calculation with the collation image, and calculates the degree of similarity between the two images. For the calculation of the degree of similarity, a known algorithm such as feature amount matching by feature amount detection, template matching using image shading comparison, and the like can be used. The calculated degree of similarity is compared with a threshold, and in a case where the degree of similarity exceeds the threshold, it is determined that the both match, and in a case where the degree of similarity does not exceed the threshold, it is determined that the both do not match. The collation unit 50a transmits the collation result to the collation image photographing machine 22 via the communication network.

In the image collation, there is an error rate due to fluctuations in the input of the registered image photographing machine 20 or the collation image photographing machine 22 to an image sensor, quantization error, and the like. The error rate consists of two, a false rejection rate, which is the probability of determining false even though it is true, and a false acceptance rate, which is the probability of determining true even though it is false. The two are in a trade-off relationship, and in a case where one decreases, the other increases. Therefore, a threshold is set so that the loss in the application target of the collation determination is the smallest.

Note that a plurality of the registered images may be acquired by changing the irradiation direction of light and registered in the registered image DB 50b of the server computer 50, and the image collation between the plurality of registered images and the collation image may be performed.

Figure 2:
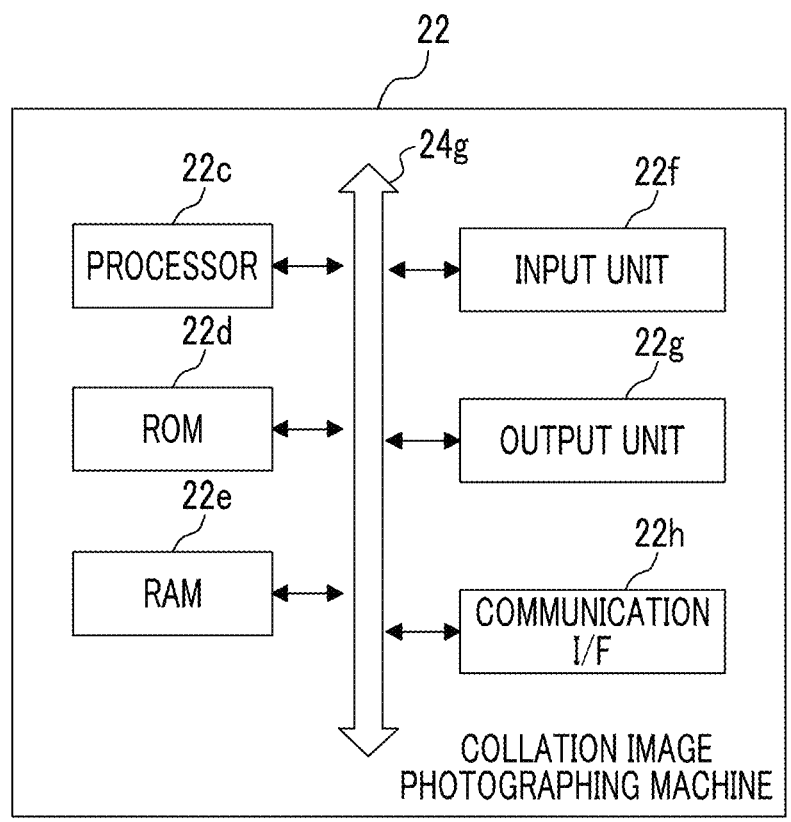
FIG. 2 is a configuration block diagram of a collation image photographing machine of an exemplary embodiment.

FIG. 2 shows a block diagram of a main configuration of a collation image photographing machine 22 such as a smartphone. The collation image photographing machine 22 includes a processor 22c, a ROM 22d, a RAM 22e, an input unit 22f, an output unit 22g, and a communication I/F 22h in addition to the light source unit 22a and the camera unit 22b described above.

The processor 22c reads out an application program stored in the ROM 22d, executes series of processing using the RAM 22e as a working memory, extracts the ink portion from the photographed image photographed by the camera unit 22b, and further cuts out the collation image. The processor 22c transmits the cut-out collation image to the server computer 50 via the communication I/F 22h. Further, the processor 22c receives the collation result from the server computer 50 via the communication I/F 22h.

The input unit 22f is composed of a keyboard, a touch switch, or the like, and the user operates the input unit 22f to start the application program.

The output unit 22g is composed of a liquid crystal display, an organic EL display, or the like and functions as a display unit, and displays a preview image in a case where the object 10 is photographed. Further, the output unit 22g displays a guide in a case of photographing the object 10 by a control command from the processor 22c. The guide will be further described later. Further, the output unit 22g displays the collation result received from the server computer 50 by the control command from the processor 22c. The collation result is either "match" or "mismatch", but other messages related to the collation may be displayed.

Figure 3A:
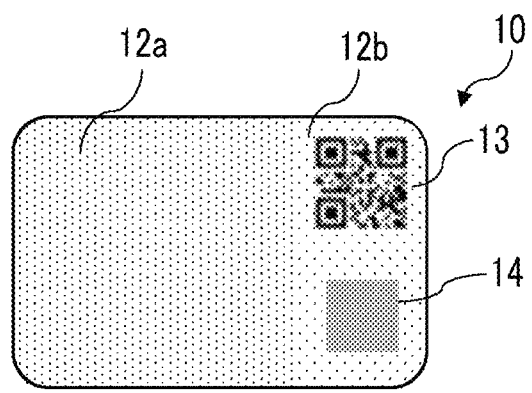
FIGS. 3A and 3B are plan diagrams of an object including a hologram portion and an object of paper of an exemplary embodiment.
Figure 3B:
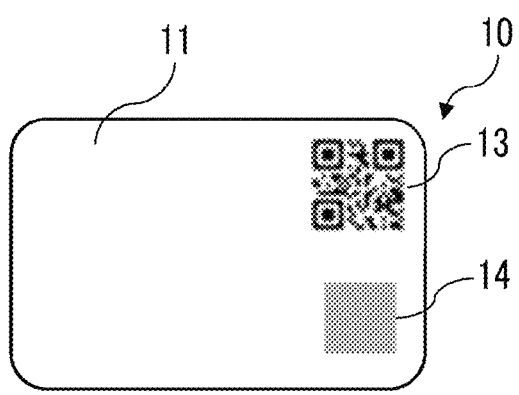

FIGS. 3A and 3B show plan diagrams of the object 10 in the present exemplary embodiment. FIG. 3A shows a case where a hologram label seal is used as the object 10. The hologram label seal includes hologram portions 12a and 12b, a QR code 13, and an ink portion 14.

The hologram portion 12a is formed substantially on a left half of the label seal and forms a hologram pattern. The hologram portion 12b is formed substantially on a right half of the label seal and is subjected to satin treatment, so that color development of a rainbow color is changed depending on an elevation angle. Here, the "elevation angle" means an angle formed by an LED light source 22a, the object 10, and the camera unit 22b in FIG. 1. For example, it is desirable that the elevation angle matches an angle φ in FIG. 1.

The QR code 13 is formed on the satin-treated hologram portion 12b. For the QR code 13, various information about the label seal is printed as a QR code. Further, in the present exemplary embodiment, the QR code 13 is printed with the relative positional relationship fixed in advance with respect to the ink portion 14. Therefore, the QR code 13 can also function as a positioning mark for extracting the ink portion 14.

The ink portion 14 is gravure-printed with gravure ink containing silver particles on the satin-treated hologram portion 12b to form a polygonal shape. In the figure, the ink portion 14 is printed in a square shape at a lower part of the QR code 13 at a fixed interval. The ink portion 14 is a random pattern area, which is a collation area to be photographed and extracted by the collation image photographing machine 22. The shape of the ink portion 14 may be an ellipse (including a circle) as well as a polygon.

FIG. 3B shows a case where a paper label seal is used as another object 10. The paper label seal includes a paper portion 11, the QR code 13, and the ink portion 14.

The QR code 13 is formed on the paper portion 11. For the QR code 13, various information about the label seal is printed as a QR code. The QR code 13 is printed with the relative positional relationship with respect to the ink portion 14 fixed in advance. Therefore, the QR code 13 can also function as a positioning mark for extracting the ink portion 14.

The ink portion 14 is toner-printed on the paper portion 11 with toner ink containing silver particles to form a polygonal shape. In the figure, the ink portion 14 is printed in a square shape at a lower part of the QR code 13 at a fixed interval. The ink portion 14 is a random pattern area, which is a collation area to be photographed and extracted by the collation image photographing machine 22.

Figure 4:
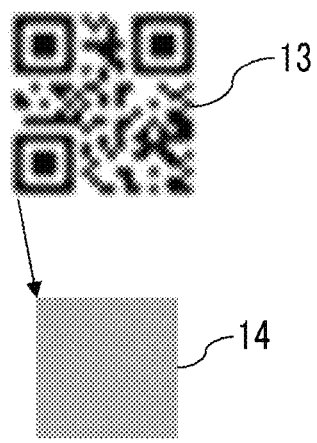
FIG. 4 is an explanatory diagram showing a relative positional relationship between a QR code (registered trademark) and an ink portion of an exemplary embodiment.

FIG. 4 schematically shows position specifying processing of the ink portion 14 using the relative positional relationship between the QR code 13 and the ink portion 14. In order to extract the ink portion 14, the QR code 13 is first detected. In a case where the QR code 13 is detected, the position of the ink portion 14 is specified by using a known relative positional relationship between the QR code 13 and the ink portion 14 (the relative positional relationship is indicated by a vector in the figure). Then, the square ink portion 14 is extracted from the photographed image at the specified position.

However, as described above, since a random pattern of the ink portion 14 changes depending on a light irradiation direction, the irradiation angle φ of the irradiation light from the light source unit 22a needs to be set to be substantially the same as the angle φ which is the condition in a case where the registered image is acquired. The expression "substantially the same" means a permissible range that includes deviations from the desired angle required to ensure the collation accuracy. In a case where the user uses a mobile terminal such as a smartphone as the collation image photographing machine 22, it is relatively difficult to set the elevation angle φ to a desired angle due to a manual operation. Although it is possible to conceive of a method of automatically repeating the photographing and adopting an image with a good condition, unless a photographer knows whether or not the elevation angle is appropriate, it is not possible to acquire an image with a good condition in a short time.

Figure 5A:
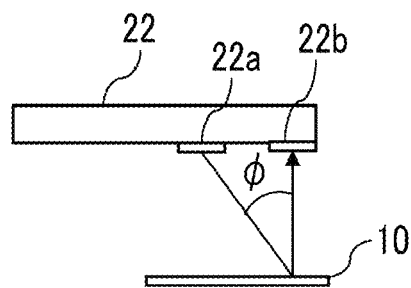
FIGS. 5A and 5B are explanatory diagrams showing a positional relationship between a light source unit, a camera unit, and an object of an exemplary embodiment.
Figure 5B:
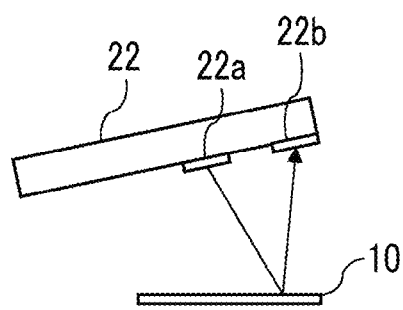

FIGS. 5A and 5B schematically show a positional relationship between the collation image photographing machine 22 and the object 10. FIG. 5A shows a case where the elevation angle φ formed by the light source unit 22a, the object 10, and the camera unit 22b is a desired angle, that is, substantially the same as the elevation angle in a case where the registered image is photographed.

On the other hand, FIG. 5B shows a case where the elevation angle formed by the light source unit 22a, the object 10, and the camera unit 22b deviates from the angle φ and is substantially different from the desired angle. Even in a case where the user tries to set the elevation angle to the desired angle by the manual operation, it is unclear in which direction the elevation angle should be adjusted, unless there is some kind of guide, which not only takes time but also reduces the collation accuracy.

Therefore, in the present exemplary embodiment, in a case where the positional relationship among the light source unit 22a, the object 10, and the camera unit 22b is inappropriate and the elevation angle is different from the desired angle as shown in FIG. 5B, a guide is displayed to notify the user of the fact and in which direction the elevation angle should be adjusted.

Figure 6:
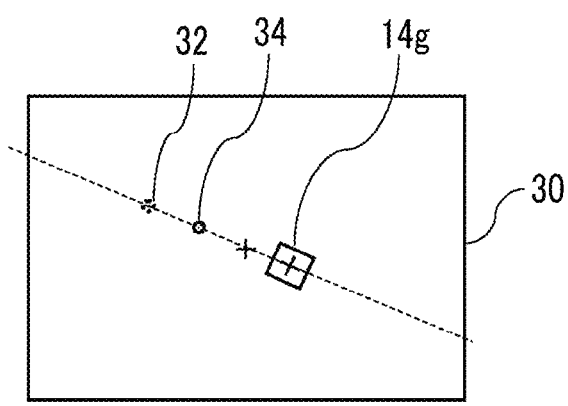
FIG. 6 is an explanatory diagram of a guide showing a light source position displayed in a preview image and a guide showing an ink portion of an exemplary embodiment.

FIG. 6 schematically shows a preview image 30 displayed on the output unit 22g of the collation image photographing machine 22 such as a smartphone.

In FIG. 6, an x mark located at a center of the preview image 30 indicates a center of the camera unit 22b. Further, a mark 32 located on an upper left from the center indicates an actual position of the light source unit 22a. The light source unit 22a and the camera unit 22b are located on a straight line shown by a broken line in the figure, and in FIG. 6, it is shown that the light from the light source unit 22a emits the ink portion 14 from the upper left.

At this time, the preview image 30 has a bright spot of the light source unit 22a, that is, a specular reflection portion of the light from the light source unit 22a, and in a case where the object 10 is placed on a horizontal plane and the collation image photographing machine 22 such as a smartphone is held at a position horizontal to face the object 10, the bright spot of the light source unit 22a is located at an intermediate point between the position of the light source unit 22a and a center position of the camera unit 22b. Since a distance between the position of the light source unit 22a and the center position of the camera unit 22b is known for each model of the collation image photographing machine 22, the intermediate point between the position of the light source unit 22a and the center position of the camera unit 22b is uniquely determined. In FIG. 6, the position of the intermediate point is shown as a guide 34. Therefore, assuming that the elevation angle $\varphi$ becomes substantially the same as the desired angle by adjusting a posture so that a surface (a surface on which the light source unit 22a and the camera unit 22b are mounted) of the collation image photographing machine 22 is horizontal to a surface of the object 10, the user can easily adjust the elevation angle to the desired angle by adjusting the elevation angle $\varphi$ so that the position of the bright spot of the light source unit 22a appearing on the preview image 30 matches the guide 34 displayed on the preview image 30.

Further, since the random pattern of the ink portion 14 can be photographed satisfactorily in a case where the elevation angle $\varphi$ is substantially the same as the desired angle, a guide 14g indicating the position of the ink portion 14 is displayed together with the guide 34. That is, since the QR code 13 is detected from the preview image 30 and an existing position of the ink portion 14 is specified by using the known relative positional relationship from the QR code 13, the guide 14g indicating the area of the ink portion 14 is displayed at the specified existing position. Hereinafter, the guide displayed on the preview image 30 will be described in more detail.

Figure 7:
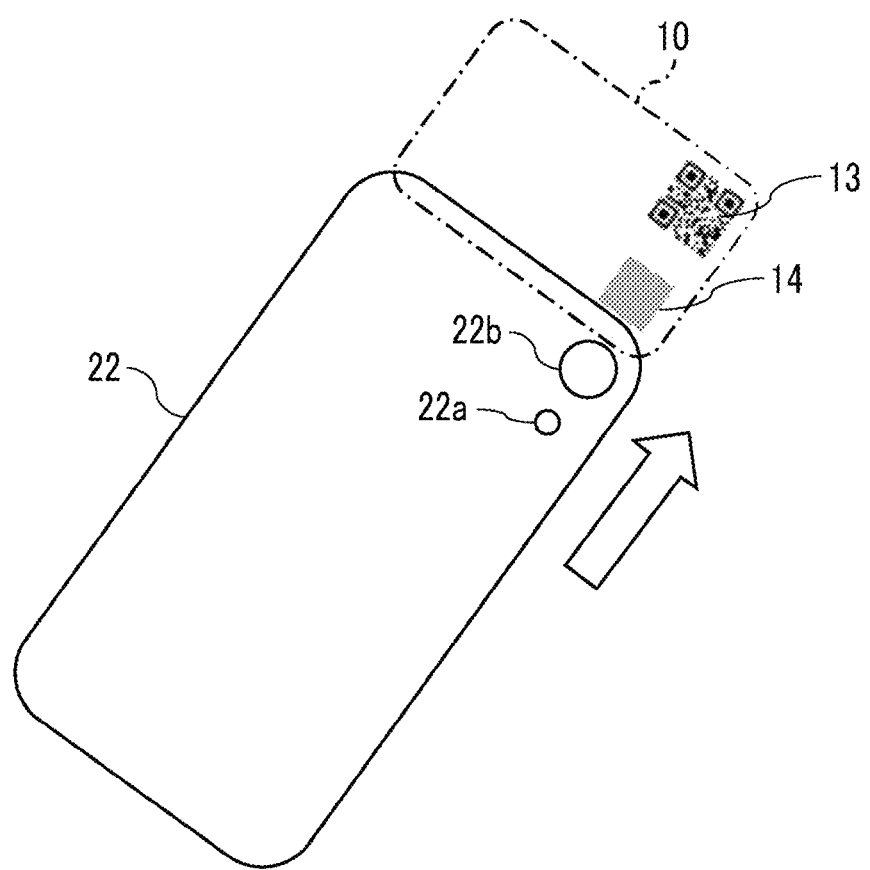
FIG. 7 is an explanatory diagram showing a positional relationship between a collation image photographing machine (smartphone) and an object of an exemplary embodiment.

FIG. 7 schematically shows a photographing posture of the collation image photographing machine 22 such as a smartphone with respect to the object 10. As shown in FIG. 7, the light source unit 22a and the camera unit 22b of the collation image photographing machine 22 are provided so as to be arranged in a vertical direction on a back surface side. The light source unit 22a is provided on a lower side in the vertical direction, and the camera unit 22b is provided on an upper side.

Note that although not shown in FIG. 7, the output unit 22g as a display unit is provided on a front surface side of the collation image photographing machine 22, and the photographed image of the camera unit 22b is displayed as a preview image.

As shown in FIG. 7, the user grips the collation image photographing machine 22 so that an arrangement direction (vertical direction) of the light source unit 22a and the camera unit 22b matches an arrangement direction of the QR code 13 and the ink portion 14 of the object 10, and manually operates so that the collation image photographing machine 22 and the object 10 are substantially parallel to each other and the camera unit 22b faces the ink portion 14. The arrow in FIG. 7 shows how the camera unit 22b is manually moved so as to face the ink portion 14 while maintaining the collation image photographing machine 22 parallel to the object 10.

Figure 8:
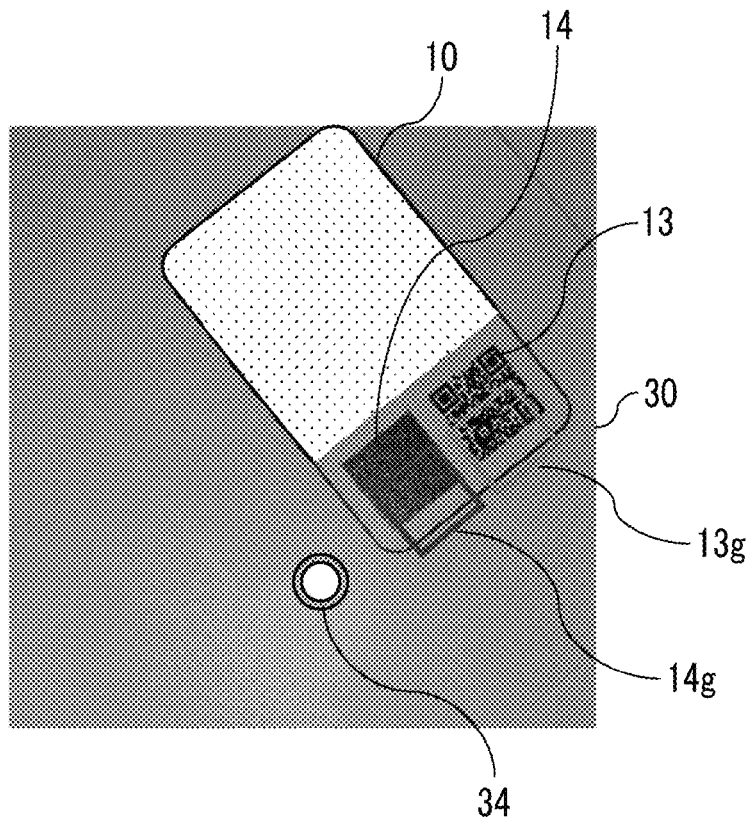
FIG. 8 is an explanatory diagram of various guides displayed on a preview image of an exemplary embodiment.

FIG. 8 shows the preview image 30 displayed on the output unit 22g of the collation image photographing machine 22 in the photographing posture of FIG. 7. The object 10, the QR code 13, and the ink portion 14 are displayed on the preview image 30. As an example, the object 10 shows a case where the printing substrate is the paper 11 as shown in FIG. 3B. Further, in a case where the surface provided with the light source unit 22a and the camera unit 22b is parallel to the surface of the object 10, the guide 34 indicating a position of a bright spot is displayed in a double circle format at a position of an intermediate point between the light source unit 22a and the camera unit 22b. Further, along with this, a guide 13g indicating a position of the QR code 13 and a guide 14g indicating a position of the ink portion 14 are displayed.

The user adjusts the elevation angle of the collation image photographing machine 22 so that the position of the bright spot of the light source unit 22a reflected in the preview image 30 is aligned with the position of the guide 34. In a case where the position of the bright spot matches the position of the guide 34, it can be recognized that the elevation angle of the collation image photographing machine 22 substantially matches the desired angle.

By displaying the guide 34 indicating the position of the bright spot in this way, the user may visually confirm whether or not the elevation angle is close to the desired angle, so that a good random pattern image of the ink portion 14 may be acquired. Note that although the shape of the ink portion 14 is known (square in the present exemplary embodiment), and it can be assumed that the deviation of the elevation angle is confirmed by using distortion from the known shape, since the distortion of the shape due to the change in elevation angle is less than 1% per degree and cannot be visually determined, visual inspection by the guide 34 is effective.

In FIG. 8, the guide 13g and the guide 14g are displayed in addition to the guide 34, but at least one of the guide 13g or the guide 14g may be displayed. Further, the guide 13g may be displayed in a case where the QR code 13 is detected, and the guide 14g may be displayed in a case where the elevation angle $\varphi$ is substantially the same as the desired angle.

Further, FIG. 8 shows a case where the printing substrate is the paper 11 as the object 10 as shown in FIG. 3B, in a case where the printing substrate is the hologram portion 12b as the object 10 as shown in FIG. 3A, the characteristic of the reflected light changes depending on the direction of light, and the color development pattern changes, and thus a guide of an elevation angle can be displayed by using the change in the color development pattern.

Figure 9:
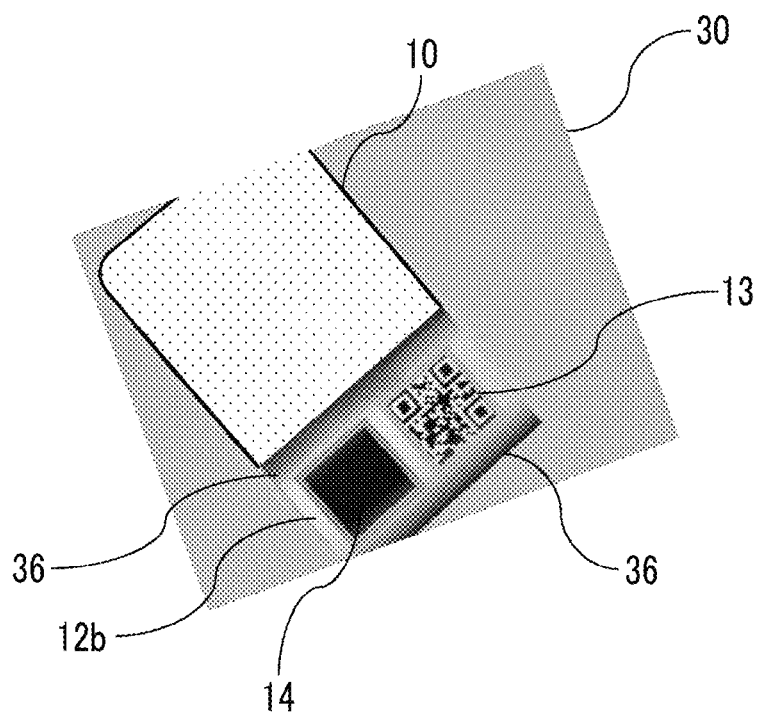
FIG. 9 is an explanatory diagram of a color development around an ink portion displayed on a preview image of an exemplary embodiment.

FIG. 9 shows another preview image 30 displayed on the output unit 22g of the collation image photographing machine 22 in the photographing posture of FIG. 7. The object 10, the QR code 13, and the ink portion 14 are displayed on the preview image 30. As shown in FIG. 3A, the object 10 shows a case where the printing substrate is the hologram portion 12b.

The QR code 13 and the ink portion 14 are printed on the satin-treated hologram portion 12b, and since the hologram portion 12b changes the color development pattern in accordance with the light irradiation direction, that is, the elevation angle φ, in a case where focusing on the periphery of the ink portion 14, the color development pattern around the ink portion 14 changes in accordance with the elevation angle φ. Therefore, the color development pattern (or color or pattern) can be used as a guide of the elevation angle.

In addition to the color development pattern (or color or pattern), a message about the color development pattern may be displayed at a fixed position on the preview image 30. For example, in a case where the color development pattern around the ink portion 14 becomes the rainbow color in a case where the elevation angle φ substantially matches the desired angle, a message such as "please match the rainbow color with the sample" is displayed. By displaying the rainbow color around the ink portion 14 and matching the actual color development pattern by using the rainbow color as a guide 36, the user can visually confirm the deviation of the elevation angle.

Note that in FIG. 9, in a case where the printing substrate of the object 10 is the hologram portion 12b, although the color development pattern (color or pattern) is displayed on the preview image 30 as the guide 36 of the elevation angle, in this case as well, the guide 34 indicating the position of the bright spot may be displayed as the guide of the elevation angle as in the case where the printing substrate is the paper 11, and at least one of the guide 34 or the guide 36 may be displayed.

Further, the guides 34 and 36 of the elevation angle may be displayed, the current elevation angle and the desired elevation angle may be compared, and a message may be displayed as to which direction the user should adjust the elevation angle.

Figure 10A:
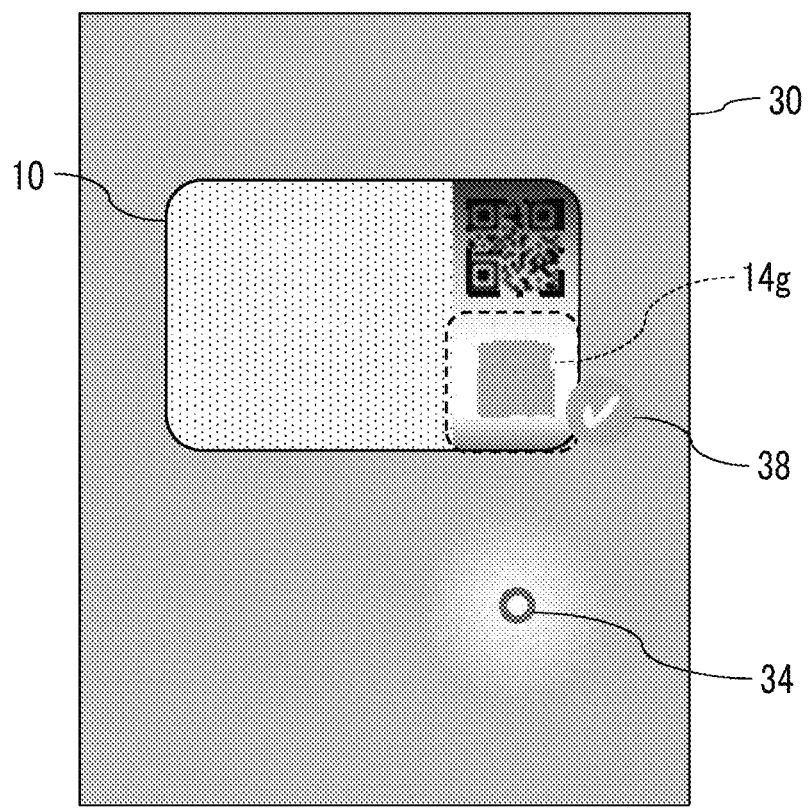
FIG. 10A is an explanatory diagram (No. 1) of a guide of an elevation angle displayed on a preview image of an exemplary embodiment.
Figure 10B:
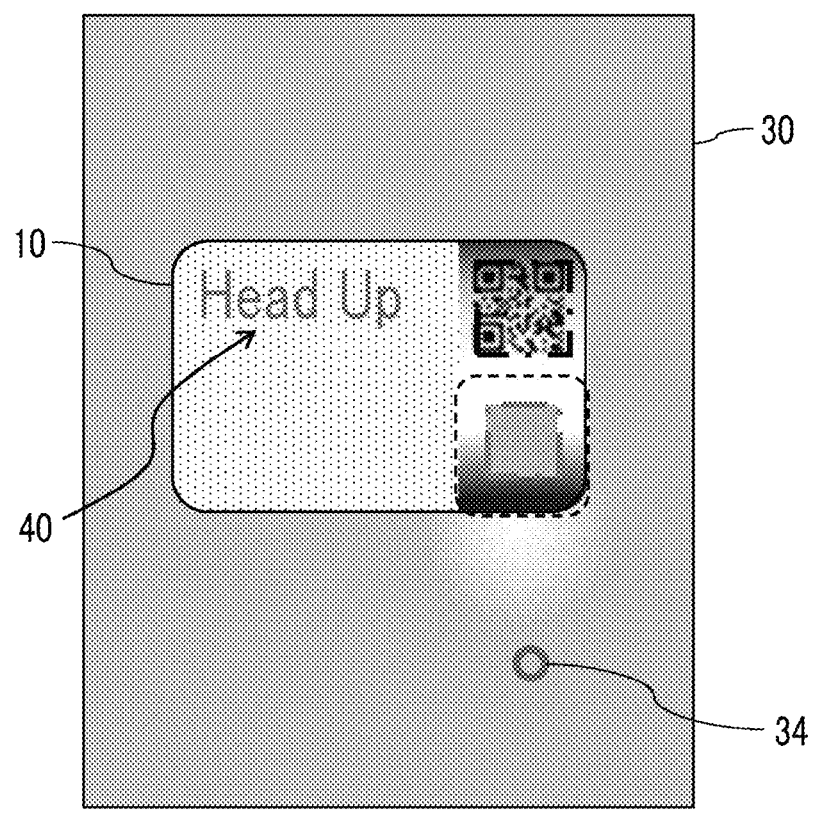
FIG. 10B is an explanatory diagram (No. 2) of a guide of an elevation angle displayed on a preview image of an exemplary embodiment.
Figure 10C:
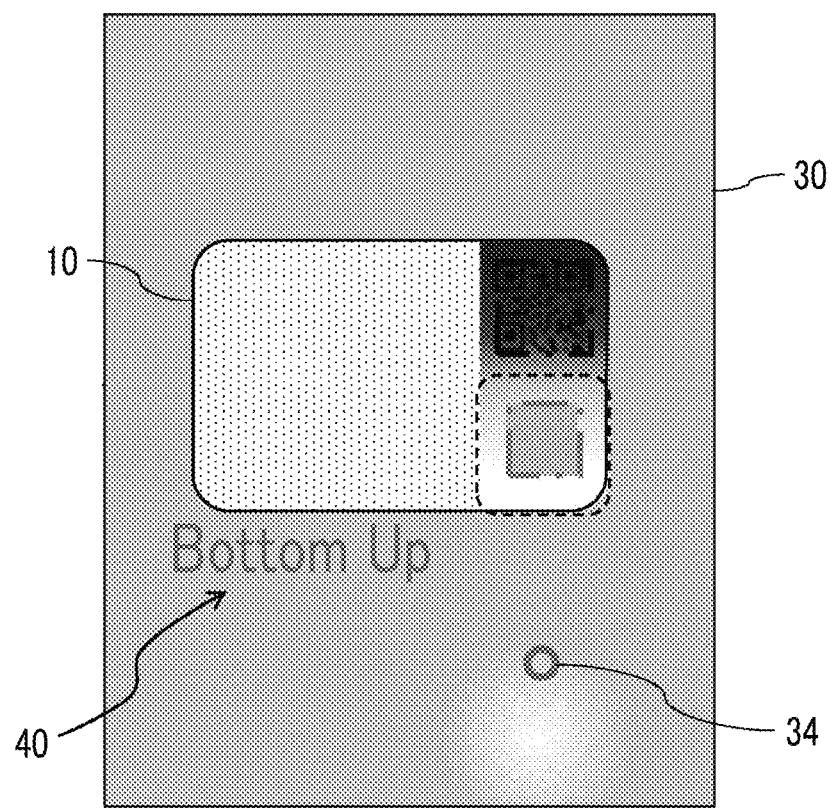
FIG. 10C is an explanatory diagram (No. 3) of a guide of an elevation angle displayed on a preview image of an exemplary embodiment.

FIGS. 10A to 10C show examples of displaying a guide of an elevation angle and a message. FIG. 10A shows the preview image 30 in a case where the position of the bright spot of the light source unit 22a matches the guide 34. The processor 22c detects the position of the bright spot reflected in the light source unit 22a in the preview image 30, and compares the detected position with the position of the guide 34. Then, it is determined that the elevation angle is substantially the same as the desired angle in a case where the both positions match within a permissible range, and a mark 38 indicating that the photographing posture is appropriate is displayed on the preview image 30. In the figure, the mark is a "check mark", but is not limited thereto.

FIGS. 10B and 10C show the preview image 30 in a case where the position of the bright spot of the light source unit 22a does not match the guide 34. The processor 22c detects the position of the bright spot reflected in the light source unit 22a in the preview image 30, and compares the detected position with the position of the guide 34. Then, it is determined that the elevation angle is not substantially the same as the desired angle in a case where the both positions do not match within the permissible range, and the mark 38 indicating that the photographing posture is appropriate is not displayed, and a message 40 indicating a direction in which the elevation angle should be adjusted in accordance with the direction of deviation between the two positions is displayed on the preview image 30. In FIG. 10B, since the position of the bright spot is located at a lower right side of the guide 34, in order to correct the position of the bright spot, the message 40, which is a message "Head UP" instructing a head portion (head) of the collation image photographing machine 22 to face upward is displayed. Further, in FIG. 10C, since the position of the bright spot is located on an upper left side of the guide 34, in order to correct the position of the bright spot, the message 40, which is a message "Bottom UP" instructing the bottom portion (bottom) of the collation image photographing machine 22 to face upward is displayed.

In FIGS. 10A to 10C, although the position of the bright spot and the position of the guide 34 are compared, in a case where the color development pattern is displayed as the guide 36 as shown in FIG. 9, the color development pattern in the vicinity of the ink portion 14 of the preview image 30 may be detected and compared with the color development pattern of the guide 36. Specifically, the image around the ink portion 14 is acquired, the center of gravity position of a specific color (for example, red, yellow, and light blue) is calculated by binarizing the color-decomposed image, and it may be determined whether or not the calculated center of gravity position is within the preset threshold.

Figure 11A:
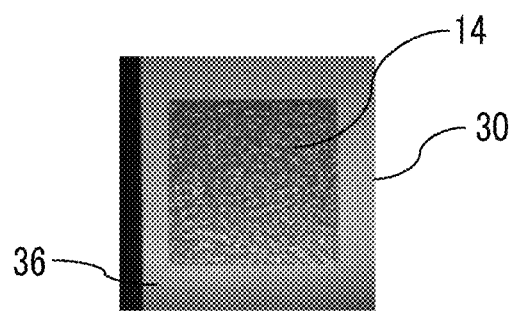
FIGS. 11A to 11C are explanatory diagrams of a color development change around an ink portion of an exemplary embodiment.
Figure 11B:
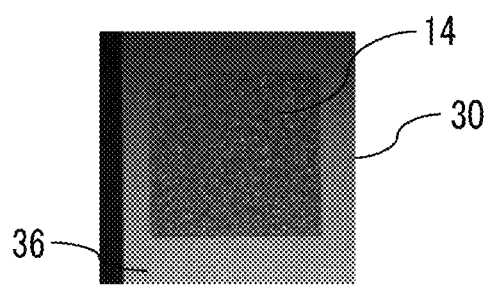
Figure 11C:
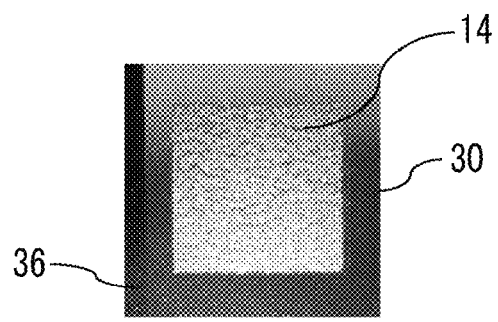

FIGS. 11A to 11C show examples of change in the color development pattern around the ink portion 14 in the preview image 30. FIG. 11A is a color development pattern in a case where the elevation angle matches the desired elevation angle. On the other hand, FIGS. 11B and 11C show color development patterns in a case where the elevation angle does not match the desired elevation angles. The processor 22c may calculate the center of gravity position of a specific color (for example, red, yellow, and light blue) by binarizing the color-decomposed image, and in a case where the calculated center of gravity position is not within the preset threshold, display a message such as "The rainbow color does not match. Please raise the angle toward you." to instruct the user in the direction of adjusting the elevation angle.

Figure 12:
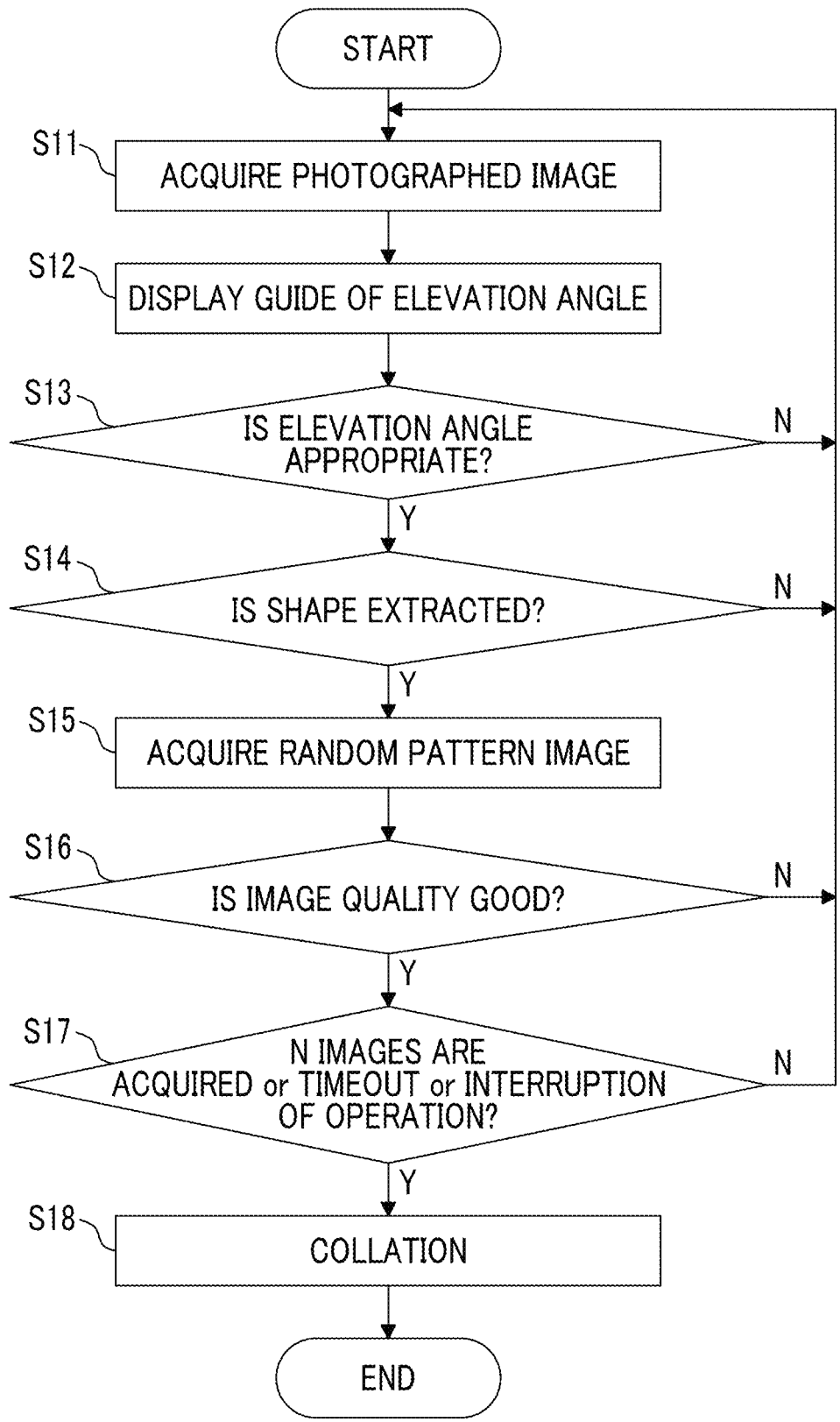
FIG. 12 is a processing flowchart of an exemplary embodiment.

FIG. 12 shows a processing flowchart of the processor 22c. This is processing realized by reading and executing a program stored in the ROM 22d or the like.

First, the processor 22c acquires a photographed image obtained by the camera unit 22b (S11).

Next, the guide of the elevation angle is displayed by superimposing the guide of the elevation angle on the acquired photographed image on the preview image 30 (S12). The guide of the elevation angle is at least one of the guide 34 indicating the position of the bright spot in a case where the elevation angle φ substantially matches the desired angle, or the guide 36 of a light emitting pattern. Along with the guides 34 and 36, messages such as "Please match the bright spot of the light source unit 22a with the guide.", "Please match the rainbow color with the sample.", and the like may be displayed. These messages can also function as the guide of the elevation angle.

Next, it is determined whether or not the actual elevation angle of the collation image photographing machine 22 is appropriate, that is, whether or not the elevation angle φ is substantially the same as the desired angle (S13). In a case where the guide 36 is displayed, the processor 22c detects the actual bright spot of the light source unit 22a in the preview image 30, compares the position of the detected bright spot with the position of the guide 34, determines that the elevation angle is appropriate in a case where the both match within the permissible range, and determines that the elevation angle is not appropriate in a case where the both do not match within the permissible range. Further, in a case where the guide 36 is displayed, the processor 22c determines that the elevation angle is appropriate in a case where the center of gravity position of the specific color is within the preset threshold range, and determines that the elevation angle is not appropriate otherwise. In a case where the elevation angle is not appropriate (NO in S13), the processing after S11 is repeatedly executed.

On the other hand, in a case where it is determined that the elevation angle is appropriate (YES in S13), the ink portion 14 is detected by using a known relative positional relationship with reference to the QR code 13. That is, the shape of the ink portion 14 (square in the present exemplary embodiment) is extracted (S14).

Figure 13:
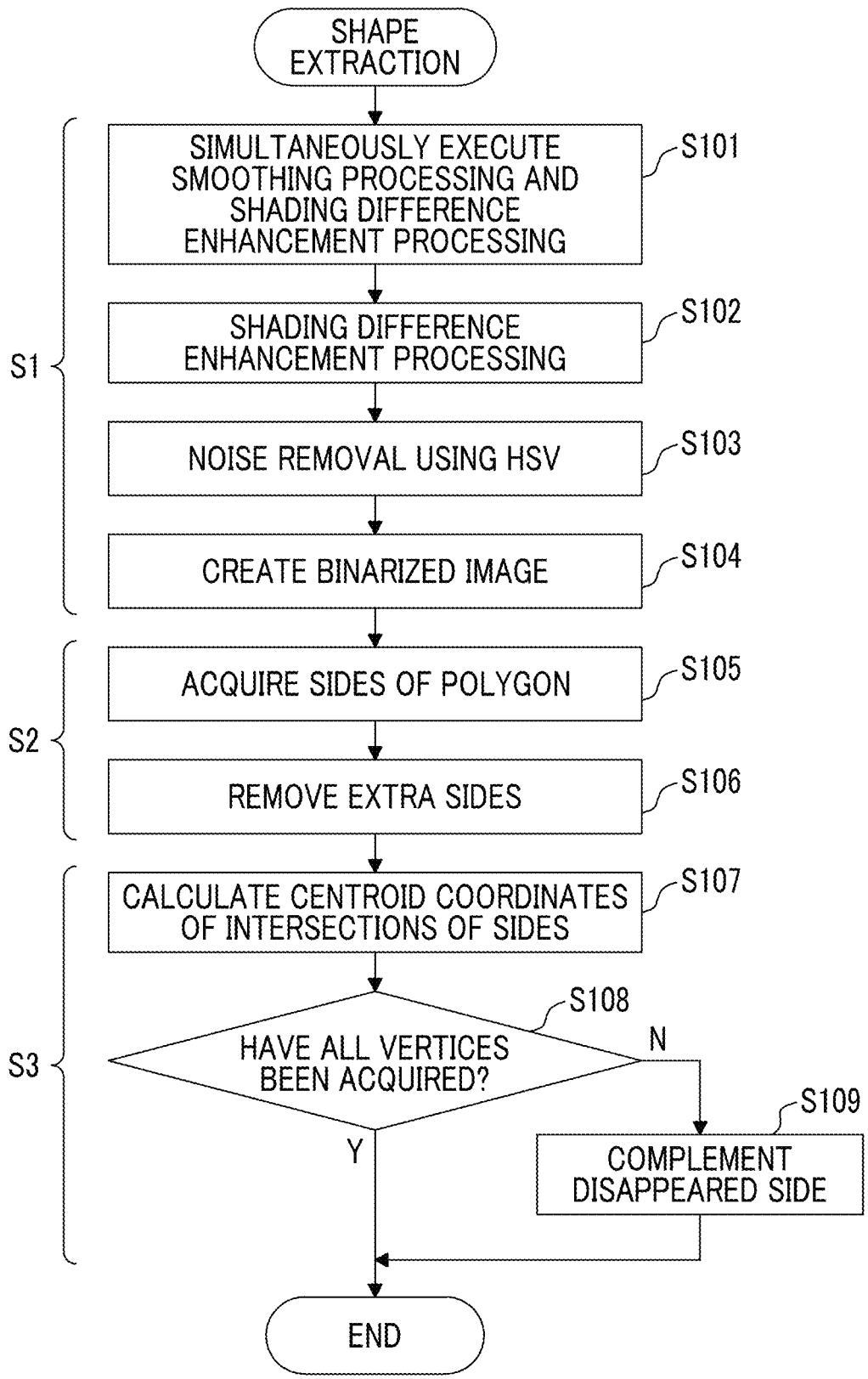
FIG. 13 is a detailed flowchart of shape extraction processing of an exemplary embodiment.

FIG. 13 shows a detailed flowchart of the shape extraction.

The purpose of the processing flowchart is to acquire coordinates of the four vertices of the ink portion 14 of the square from the photographed image, and the processing is substantially classified into three processing of binarized image generation processing (S1), rectangular edge extraction processing (S2), and vertex coordinate estimation processing (S3).

Binarized Image Generation Processing

First, the binarized image generation processing (S1) will be described.

In the processing, first, smoothing processing and shading difference enhancement processing are simultaneously executed on the original image (S101). The shape of the ink portion 14 is blurred by simply performing the smoothing processing on the original image. Further, although the unevenness of the ink portion 14 is emphasized by simply performing the shading difference enhancement processing on the original image, the unevenness of the hologram portion 12b is also emphasized at the same time, so that the ink portion 14 cannot be extracted.

Therefore, the smoothing processing and the shading difference enhancement processing are simultaneously executed on the original image to remove the unevenness of the hologram portion 12b and the ink portion 14, and the ink portion 14 is identified from the hologram portion 12b. Specifically, a mean-shift filter can be used for simultaneous execution of the smoothing processing and the shading difference enhancement processing. The mean-shift filter is realized by the processor 22c. The mean-shift filter is a filter that fills similar colors in a designated pixel space with the same color. As a result, the color of the silver ink portion 14 approaches the same color, and a boundary between a rainbow-colored background of the hologram portion 12b and the silver ink portion 14 has a different color area, so that a shading difference of the boundary between the hologram portion 12b and the ink portion 14 is emphasized while the shape of the ink portion 14 is maintained.

Note that although there is a filtering method of performing smoothing processing while retaining the edges, such as a bilateral filter, the inventors have confirmed that the noise in the hologram portion 12b and the ink portion 14 cannot be removed by the method. By using the mean-shift filter, smoothing is performed for each color by using the color difference between the hologram portion 12b and the ink portion 14 while retaining the edges, and noise may be removed without losing the edges.

The mean-shift filter first searches for the center of gravity of the color distribution of the original image. That is, centroid coordinates (xc, yc) and the colors (rc, gc, bc) of a color space area having a radius sr centered on the colors (r, g, b) of certain pixels (x, y) are calculated and the center of gravity is searched under the following condition. Here, sp is a radius of a search area.

Condition: $|x-xc| \leq sp$, $|y-yc| \leq sp$, $\|(r, g, b)-(rc, gc, bc)\| \leq sr$ Then, in a case where the above condition is satisfied, by setting (x, y, r, g, b)=(xg, yg, rc, gc, bc), the center of gravity is searched again. The above center of gravity search processing is repeatedly executed.

Then, a color space distance ε and the number of repetitions n are set in advance, it is determined whether or not the following condition is satisfied, and in a case where the condition is satisfied, the processing ends.

Condition: the number of repetitions n is satisfied, or $|x-xc|+|y-yc|+(r-rc)^2+(g-gc)^2+(b-bc)^2<\varepsilon$.

After the center of gravity search processing ends, smoothing is performed with the value of the center of gravity in the color space. That is, after the polar search ends, each pixel in the space is set as a center of gravity value of the color space. The edges are then clarified by using the Gaussian pyramid and the threshold sr.

Since the mean-shift filter performs the smoothing processing by using a distance difference in the color space, this is an effective smoothing processing in a case where there is a difference in the color space distance between the foreground and the background. Therefore, this is an effective processing for the original image in which an achromatic ink portion 14 exists in the foreground and a chromatic hologram portion 12b exists in the background.

In the mean-shift filter, the performance of the smoothing processing and the shading difference enhancement processing can be controlled by using a color space radius sr and a pixel space radius sp as major parameters. Therefore, by adjusting the parameters, a ratio of the smoothing processing and the shading difference enhancement processing can be adjusted. Specifically, (1) since a search range of pixels smoothed (filled) by the pixel space radius sp is designated, in a case where sp is large→search range can be adjusted to be wide, and in a case where sp is small→search range can be adjusted to be narrow.

Note that in a case where the sp is set too large, it takes a long time to processing, for example, so it is desirable to take the fact into consideration.

(2) Since the range of similar colors to be filled in the same color is determined by the color space radius sr, in a case where sr is large→it can be adjusted so that even slightly different colors are recognized as the same color, and in a case where sr is small→it can be adjusted so that similar colors are recognized as the same color.

In the present exemplary embodiment, the parameters sp and sr of the mean-shift filter are set to (sp, sr)=(10,30), or the like.

After the smoothing processing and the shading difference enhancement processing are simultaneously executed on the original image (S101), an additional shading difference enhancement processing is further executed for a portion where the shading difference cannot be obtained by the processing of S101 (S102).

In a case where there is no sufficient difference in the color space distance between the background color and the ink portion 14, the foreground and the background are assimilated, and there may be portions where the shading difference enhancement is insufficient only by the processing of S101. Therefore, by further executing the shading difference enhancement processing, the shape of the ink portion 14 is extracted more stably.

Specifically, the image processed in S101 is RGB-decomposed, and the shading difference enhancement processing is executed in each RGB color space. This means flattening of an in-image brightness histogram. Then, in order to extract an edge gradient, a Sobel filter for each of the vertical and horizontal directions is applied to each RGB color image. Note that since a gradient value calculated by the Sobel filter is not eight bits (256 gradations), it may be normalized to eight bits. The normalization method is processing of taking an absolute value of a gradient image and replacing all the pixel values of 255 or more with 255. As a result, the edge gradient may be acquired independently of disturbance noise.

After executing additional shading difference enhancement processing (S102), noise removal processing using an HSV color space is executed (S103). Here, the HSV color space is a color space composed of three components of Hue, Saturation/Chroma, and Value/Brightness.

In a case where a rough shape of the ink portion 14 is extracted in S102, noise is generated at a boundary between the white color and the light blue color of the hologram portion 12. In particular, since the gradients of the white color and the light blue color in an R space image are large, noise such as an edge is generated in a case where the Sobel filter is applied. Therefore, the noise is removed by using the HSV color space. Specifically, (1) the processed image 13 in S101 is HSV decomposed (2) S image is binarized (3) vertical and horizontal Sobel filter is applied to S binary image (4) black-and-white inverted binary image of vertical and horizontal Sobel image and H image are OR-synthesized.

After executing the processing of S103, a binarized image is created (S104). That is, a total of 6 vertical and horizontal gradient images of the R, G, and B images are respectively binarized. A binarization threshold may be set differently for each of R, G, and B. Then, a total of six binarized images of vertical and horizontal components and RGB color components are OR-synthesized.

Rectangular Edge Extraction Processing

Next, the rectangular edge extraction processing will be described.

After creating the binarized image in S104, the sides of the polygon constituting the square ink portion 14 are acquired from the binarized image (S105). Specifically, this is edge extraction processing using a stochastic Hough transform. Note that the stochastic Hough transform is an optimization of the Hough transform, and instead of calculating using all the pixels, points sufficient for straight line detection are randomly selected from the image and calculated. A (non-stochastic) Hough transform can also be used in S104. However, parameter tuning is difficult, and there is a drawback that the sensitivity is too good for the rectangular edges of the binarized image.

After acquiring the sides of the polygon (S105), the processing of removing extra sides is executed (S106). That is, straight lines that are not rectangular edges (sides) are removed from the straight lines extracted by the stochastic Hough transform. Specifically, a method of removing a straight line having an inclination of a fixed value or more, or a long straight line with respect to the size of the collation area, a straight line of which an angle in which vertical and horizontal lines intersect is within a fixed angle, or removing a straight line in contact with an image frame is used. In addition to this, extra sides may be removed by extracting edges with a rectangular hue by using a color space.

Vertex Coordinate Estimation Processing

After the rectangular edge extraction processing (S2) is completed, the vertex coordinate estimation processing (S3) of the square ink portion 14 is executed.

In the processing, the centroid coordinates of the intersections of the sides are calculated from the image obtained by removing the extra sides in S106 (S107). That is, instead of the intersections consisting of each side, the centroid coordinates of an intersection group within a certain vicinity are calculated. Although the intersections of vertical and horizontal straight lines are calculated for the processed image 23 by addressing a one-dimensional simultaneous equation, since an edge width of the binarized image after OR-synthesis is two to three pixels, a plurality of straight lines are extracted for the same edge by the stochastic Hough transform. Therefore, there are a plurality of intersections in the vicinity of certain coordinates. Since these intersections are likely to indicate the same vertex, the centroid coordinates of the intersection group are acquired, and the centroid coordinates are redefined as the vertices of the shape of the ink portion 14.

In centroid coordinate calculation processing of the intersection group, first, a plurality of intersections in a certain vicinity are dilated and combined into one. The dilation processing is processing in which in a case where there is a white pixel in peripheral pixels of a certain pixel, the pixel is converted into the white pixel thereby sequentially expanding the white pixel. Next, labeling is performed on each intersection set that has been dilated. Then, the centroid coordinates of each labeled intersection set are calculated. In a case where the centroid coordinates are calculated as described above, the calculated centroid coordinates are set as the vertex candidates.

Since there are four vertices in the square ink portion 14, four vertex candidates can be set normally. In a case of setting the vertex candidates, known shape characteristics of the ink portion 14, that is, the lengths of the sides and diagonal lines can be used as the condition. In a case where there are a plurality of pairs of vertices that satisfy the condition, a plausible pair of vertices is selected. For example, in the square ink portion 14, the condition that the lengths of the four sides are equal to each other is used, and the pair having the smallest dispersion of the side lengths is set as the pair of vertices.

Then, it is determined whether or not all the vertices of the ink portion 14 have been acquired (S108). In the square ink portion 14, it is determined that all the vertices have been acquired in a case where the four vertices are acquired. In a case where all the vertices have not been acquired, it means that all the sides of the ink portion 14 have not been extracted, so the complementary processing of the disappeared side is executed next (S109).

In the complementary processing of the side, it is determined whether or not three sides constituting the square have been extracted from the square ink portion 14. Normally, in a case where the ink portion 14 is printed on the hologram portion 12b as a printing substrate, in a case where the red of the background of the hologram portion 12 is covered with the red of the foreground, extraction of the side may fail. In short, this is a case where a color space distance difference between the background and the foreground is small.

Therefore, it is first determined whether or not the three sides have been extracted. The selection of the three sides can be estimated from the known shape characteristics of the ink portion 14, that is, the length or the position of the edges.

In a case where three sides are extracted, a length x of the side among the three sides having no opposite side is calculated from the centroid coordinates already calculated. Then, a new parallel side is drawn at a portion separated by the length x of the side. Specifically, it is assumed that the four sides constituting the square are a, b, c, and d, a and c are opposite sides, and b and d are opposite sides, and in a case where only three sides of a, b, and c are extracted, a side parallel to b is drawn at a position separated by x from b to be d. As parallel sides separated by x from b, it is possible to estimate a total of two, one on each of the both sides of b, and since one of the sides does not exist in the image, the side d can be uniquely drawn. This complements the disappeared sides.

After the complementary processing of the disappeared sides, the centroid coordinates of the intersection may be calculated again to acquire the coordinates of all the vertices.

Note that after the complementary processing of the disappeared sides, the threshold may be lowered for the binarized image obtained in S104, and the stochastic Hough transform may be executed again to reacquire the side, and the side obtained in this way and the side obtained by complementing may be integrated, and the processing may be transferred to the vertex coordinate estimation processing (S3) again.

Referring back to FIG. 12, in a case where the shape is extracted by acquiring the coordinates of the four vertices of the ink portion 14 as described above (YES in S14), the processor 22c acquires a random pattern image by cutting out the collation image with reference to the coordinates of these four vertices (S15). Then, an image quality evaluation of the obtained random pattern image, that is, whether or not the image quality of the random pattern image is good is determined (S16).

Specifically, whether or not the image quality is good can be determined by evaluating the following index values and determining whether or not these index values exceed the threshold.

(1) Whether the position, size, and angle of the square are appropriate
(2) Degree of blur (standard deviation of Laplacian filter value)
(3) Degree of shaking (maximum and minimum differences of standard deviation of Sobel filter values in four directions)
(4) Brightness (average brightness)
(5) Randomness (a value obtained by cutting out the portion of the central ¼ size of the image, obtaining the correlation value between each coordinate of the image and the image of the same size as the starting point, subtracting the average value from the maximum value of the correlation value group, and dividing by the standard deviation)
(6) Degree of deviation of the light source (aspect ratio of the brightness inclination of the image=the inclination in a case where the average brightness of the same row is linearly approximated in the column direction/the inclination in a case where the average brightness of the same column is linearly approximated in the row direction)

It is possible to determine whether or not the image quality is good by optionally combining any one or a plurality of these index values. For example, (1) and (6) are used, (1), (5), and (6) are used, or the like.

The processing of S11 to S16 is automatically repeated until a predetermined upper limit number of N images are acquired, until a timeout, or until the user interrupts the photographing operation (S17). Then, the collation processing is executed by using the random pattern images obtained for the upper limit number of N images or a plurality of random pattern images obtained until the timeout or the interruption of photographing (S18).

In the collation processing, a collation request is transmitted to the server computer 50 with the acquired upper limit number of N images or a plurality of random pattern images attached. The collation unit 50a of the server computer 50 collates the received random pattern image with the registered image, and returns the collation result to the collation image photographing machine 22. The processor 22c receives the collation result from the server computer 50 and displays the collation result on the output unit 22g.

Modified Example

In the exemplary embodiment, as shown in FIG. 7, a configuration in which the ink portion 14 is irradiated with light of the light source unit 22a from one direction on a plane and photographed by the camera unit 22b has been described as an example. However, since the minute unevenness random pattern of the ink portion 14 changes depending on the light irradiation direction, by registering a first registered image in a case where light is emitted from a first direction on a plane and a second registered image in a case where light is emitted from a second direction different from the first direction on a plane in the registered image DB 50b as the registered images, and collating the collation image obtained by emitting light from the first direction on a plane with the first registered image in the first collation, and collating the collation image obtained by emitting light from the second direction on a plane with the second registered image in the second collation, a so-called double check can be performed to further improve the collation accuracy.

Figure 14:
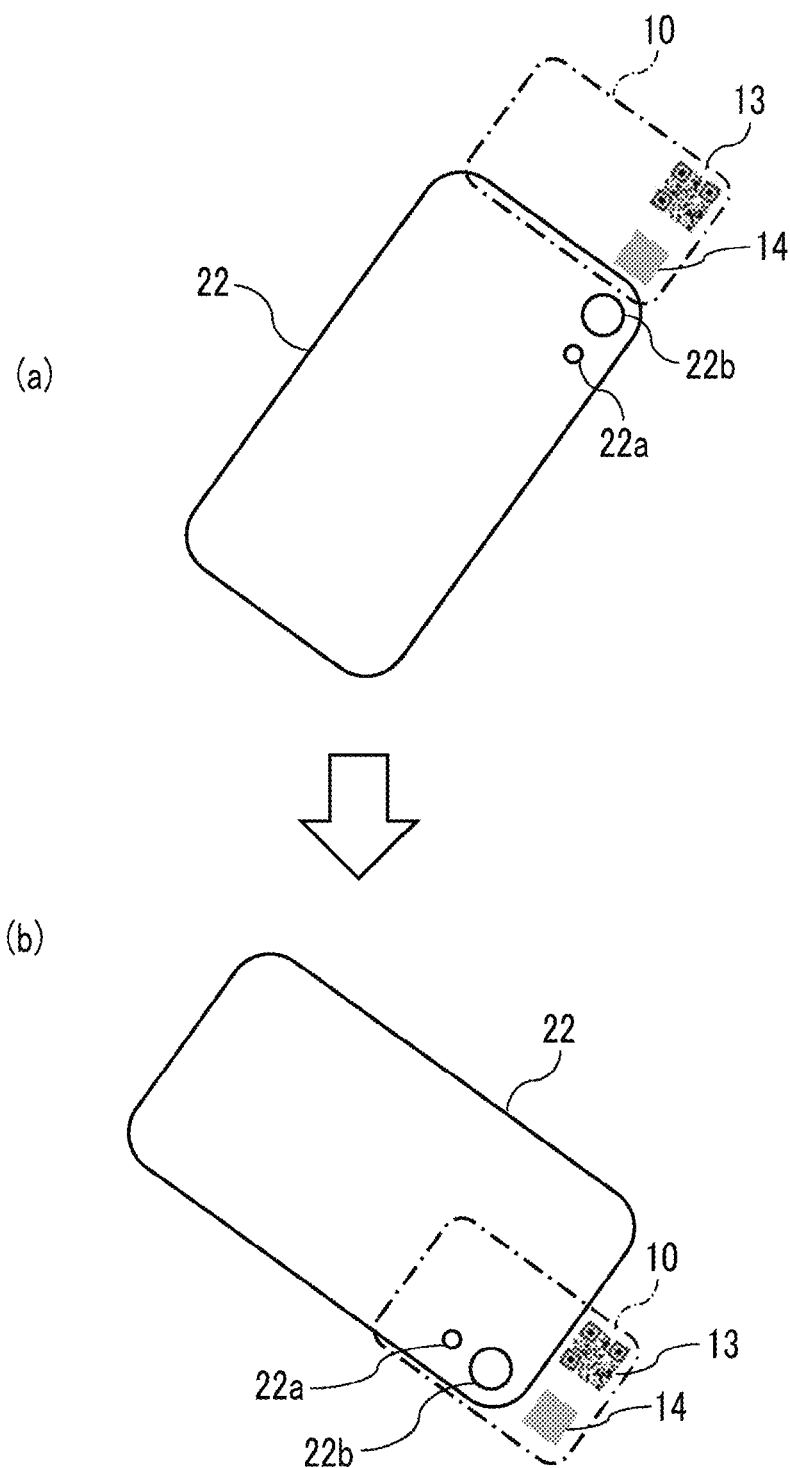
FIG. 14 is an explanatory diagram of a photographing direction change of a modified example.

FIG. 14 schematically shows a positional relationship between the collation image photographing machine 22 such as a smartphone and the object 10. (a) of FIG. 14 is the same as in the case of FIG. 7, and the photographing posture of the collation image photographing machine 22 is set so that the light from the light source unit 22a is emitted from a lower side of the ink portion 14 on a plane.

In (b) of FIG. 14, the operating posture of the collation image photographing machine 22 is set so that the object 10 is not moved from a case of (a) of FIG. 14 and the posture of the collation image photographing machine 22 is rotated 90 degrees clockwise on a plane and the light from the light source unit 22a is emitted from the left side of the ink portion 14 on a plane.

A double check is performed by cutting out the collation image so that the first direction of the first collation is the direction shown in (a) of FIG. 14 and collating the collation image with the first registered image, and cutting out the collation image so that the second direction of the second collation is the direction shown in (b) of FIG. 14 and collating the collation image with the second registered image.

At this time, since the guide of the elevation angle has a function of notifying the user of the light irradiation direction, by displaying the guide 34 at the position of the bright spot in a case of emitting from the lower side of the ink portion 14 at the time of the first collation, and displaying the guide 34 at the position of the bright spot in a case of emitting from the left side of the ink portion 14 at the time of the second collation, it is possible to accurately notify the user of the change in the light irradiation direction from the light source unit 22*a* of the collation image photographing machine 22 in the first and second collation.

Figure 15:
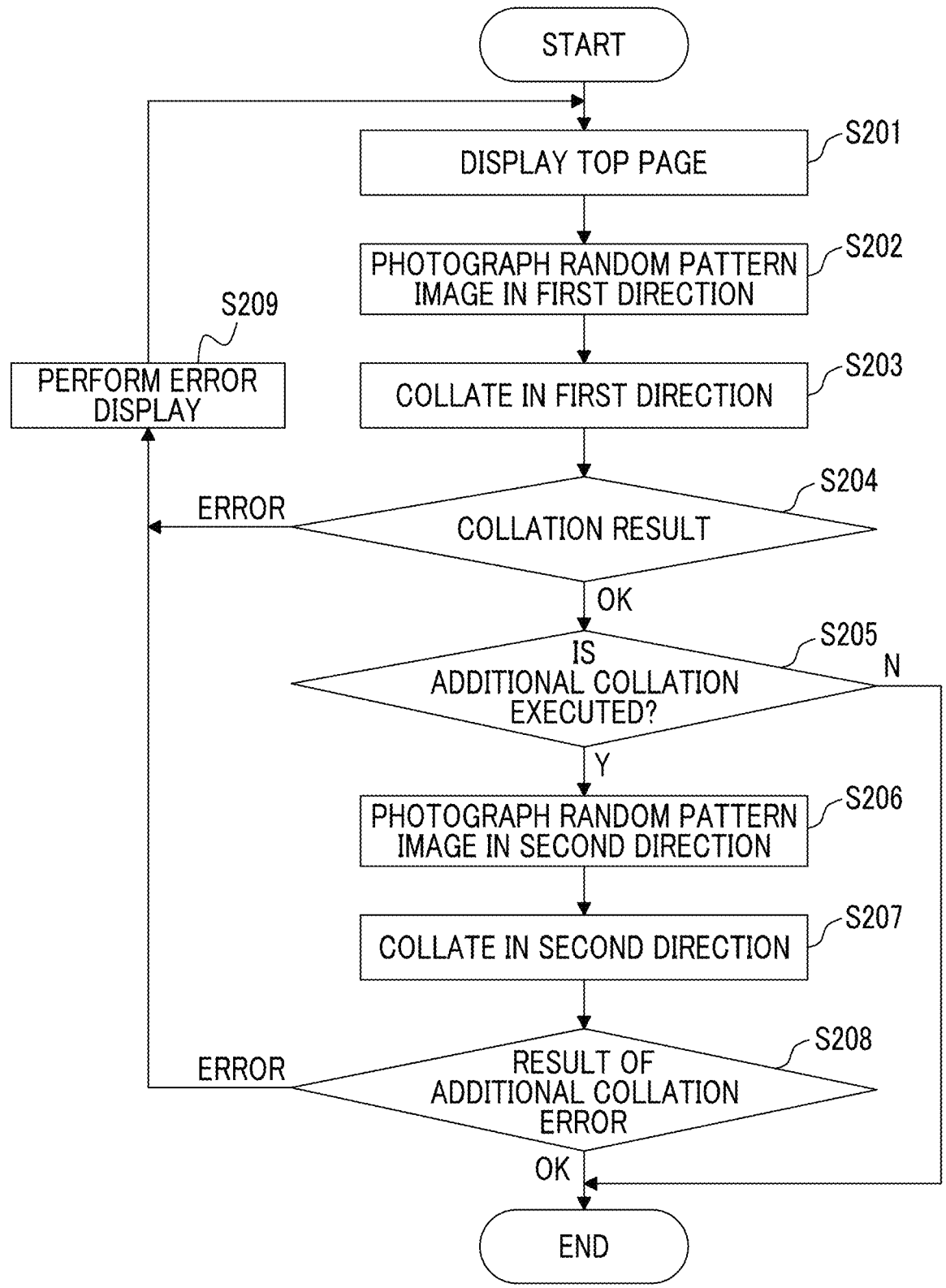
FIG. 15 is a processing flowchart of a modified example.

FIG. 15 shows a processing flowchart of the processor 22*c* of the modified example. This is processing realized by reading and executing a program stored in the ROM 22*d* or the like.

First, a top page is displayed on the output unit 22*g* (S201). Various menus are displayed on the top page. The menu includes "start collation", and the user selects and operates the start of collation to start the subsequent processing.

First, the processor 22*c* photographs a random pattern image in the first direction on a plane (S202). That is, for example, the first direction is set as the lower side of the ink portion 14, and S11 to S17 of the processing flowchart shown in FIG. 12 are executed to acquire the random pattern image in the first direction. Then, a collation request is made by attaching the random pattern image with respect to the server computer 50 (S203), and the collation result is received.

As a result of collation (S204), in a case where the random pattern image does not match the first registered image, an error display is performed on the output unit 22*g* (S209), and the processing after S201 is repeated. Further, in a case where the image quality of the random pattern image does not reach the image quality required for collation, processing of S202 is executed after displaying to that effect, and the random pattern image in the first direction is re-photographed.

As a result of collation, in a case where the random pattern image matches the registered image (OK in S204), the processor 22*c* performs a display to that effect and then displays a selection button as to whether or not to perform additional collation. In a case where the user does not execute the additional collation, the processing ends (S205).

In a case where the user executes the additional collation (YES in S205), the processor 22*c* photographs the random pattern image in the second direction on a plane (S206). That is, for example, the second direction is set perpendicular to the first direction and set as the left side of the ink portion 14, and S11 to S17 of the processing flowchart shown in FIG. 12 are executed to acquire the random pattern image in the second direction. Then, a collation request is made by attaching the random pattern image with respect to the server computer 50 (S207), and the collation result is received.

As a result of collation (S208), in a case where the random pattern image does not match the second registered image, an error display is performed on the output unit 22*g* (S209), and the processing after S201 is repeated. Further, in a case where the image quality of the random pattern image does not reach the image quality required for collation, processing of S206 is executed after displaying to that effect, and the random pattern image in the first direction is re-photographed. In a case where both the first collation and the second collation match the registered image (OK in S208), a message to that effect is displayed as the collation is successful, and the processing ends.

Figure 16:
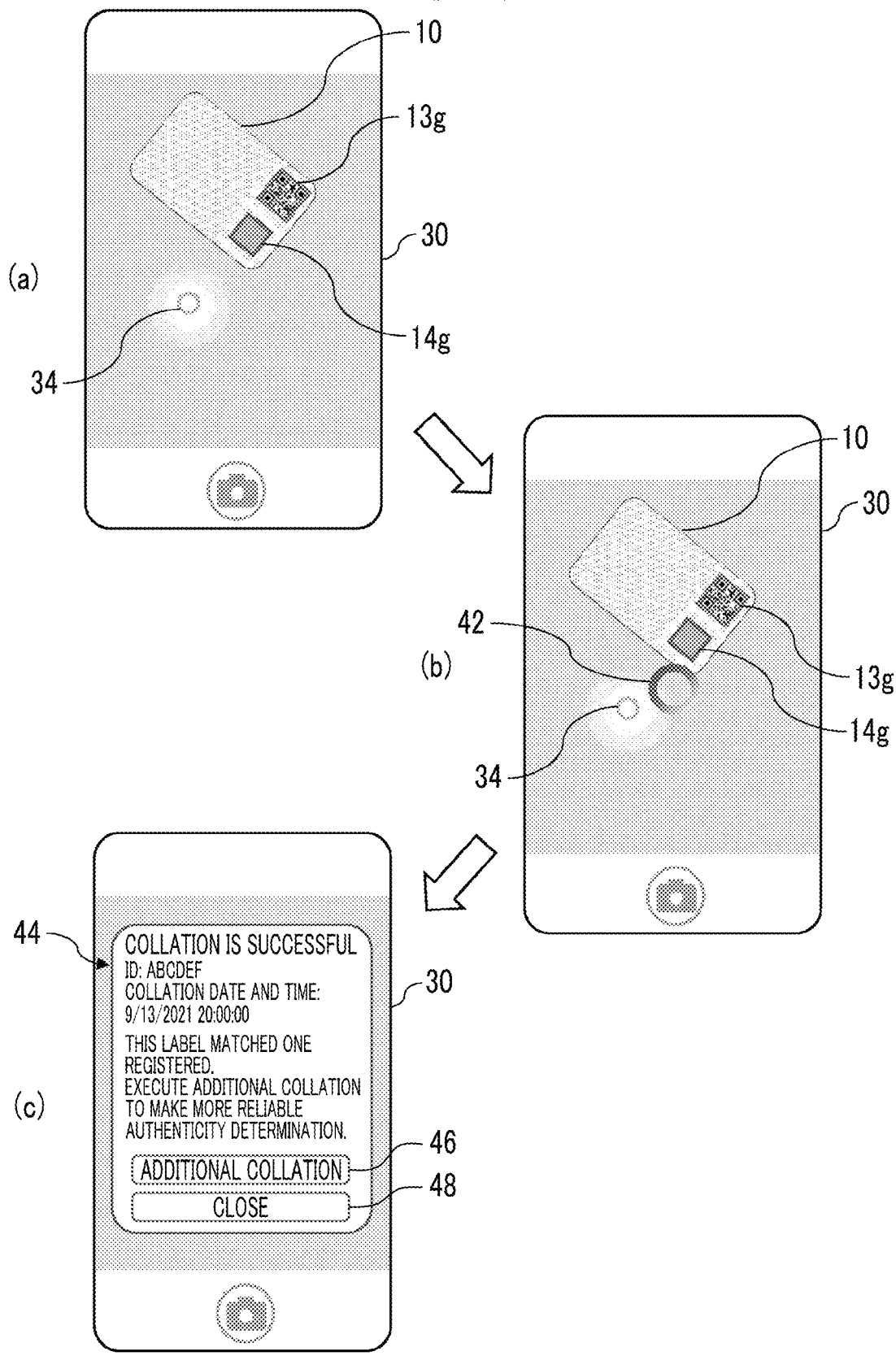
FIG. 16 is an explanatory diagram (No. 1) of a preview image transition of a modified example.

FIG. 16 shows first collation processing. (a) of FIG. 16 shows the preview image 30, and the object 10, the guide 13*g*, the guide 14*g*, and the guide 34 are displayed. The guide 34 indicating the elevation angle is displayed on the lower side of the ink portion 14. (b) of FIG. 16 shows the preview image 30 in a case where the user adjusts the photographing posture of the collation image photographing machine 22 so that the bright spot of the light source unit 22*a* matches the guide 34, and the mark 38 is displayed in response to the fact that both positions match (refer to FIG. 10A). At this time, the photographed image is automatically acquired, the random pattern image is cut out, and the photographed image is transmitted to the server computer 50 as the collation image for collation. During the collation, a ring-shaped mark 42 is displayed. By visually recognizing the mark 42, the user can confirm that the image is being collated by the server computer 50. (c) of FIG. 16 is the preview image 30 in a case where the first collation is successful, and the message 44 "The collation is successful." is displayed. Further, along with the message 44, messages 46 and 48 of "additional collation" and "end" are displayed. In a case where the user selects the message 46 of "additional collation", the screen transitions to the screen of FIG. 17.

Figure 17:
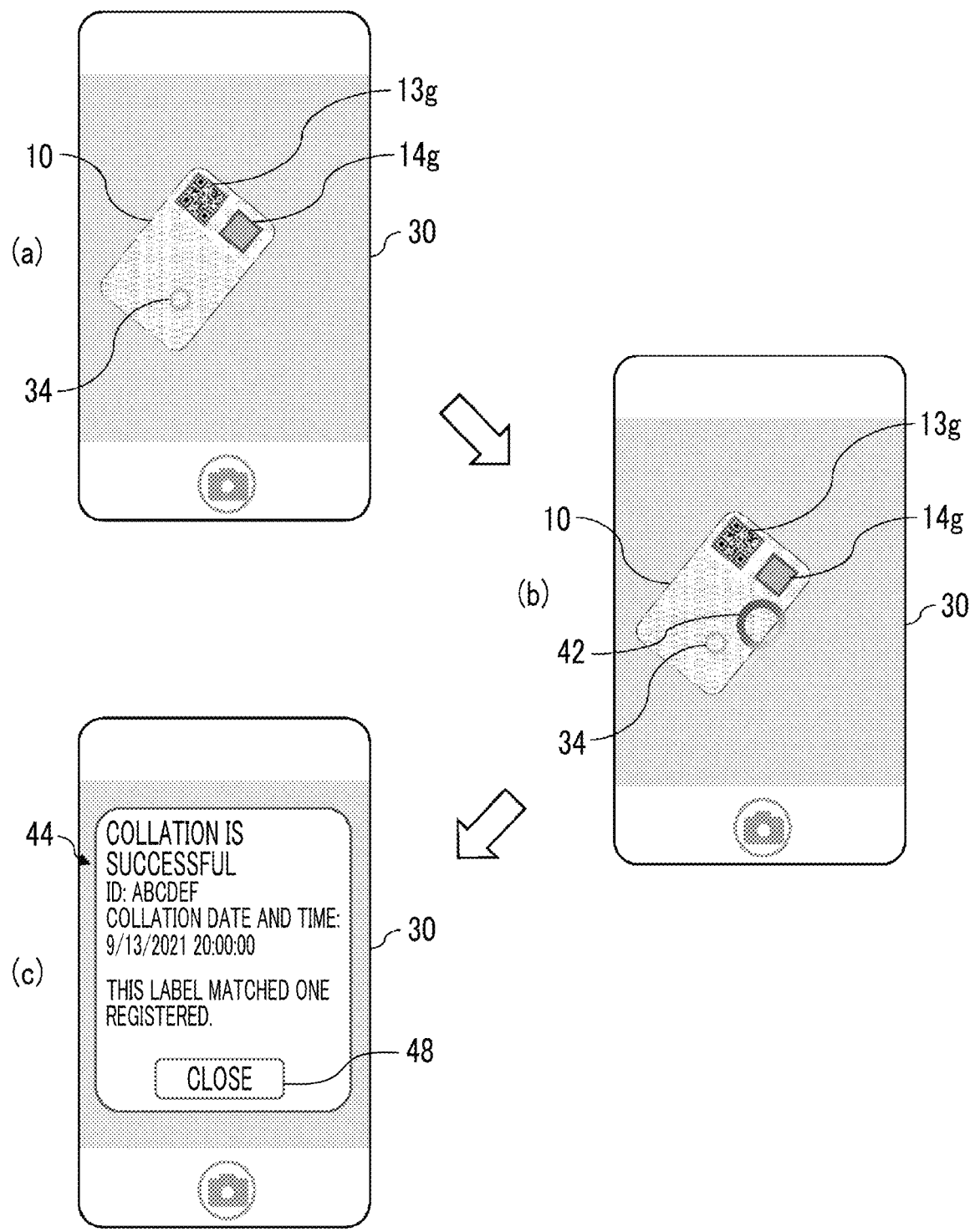
FIG. 17 is an explanatory diagram (No. 2) of a preview image transition of a modified example.

FIG. 17 shows second collation processing. (a) of FIG. 17 shows the preview image 30, and the object 10, the guide 13*g*, the guide 14*g*, and the guide 34 are displayed. The guide 34 indicating the elevation angle is displayed on the left side of the ink portion 14. (b) of FIG. 17 shows the preview image 30 in a case where the user rotates and adjusts the photographing posture of the collation image photographing machine 22 by 90 degrees so that the bright spot of the light source unit 22*a* matches the guide 34, and the mark 42 is displayed in response to the fact that both positions match. At this time, the photographed image is automatically acquired, the random pattern image is cut out, and the photographed image is transmitted to the server computer 50 as the collation image for collation. (c) of FIG. 17 shows the preview image 30 in a case where the second collation is successful, and the message 44 "The collation is successful." is displayed.

Further, along with the message 44, an ID of the object 10 and the collation date and time are displayed, and further, a message 48 "End" is displayed.

In a case where the user selects the message 48 "end", the processing ends.

Note that in the modified example, in the first collation, light is emitted from the lower side of the ink portion 14, and in the second collation, the light is emitted from the left side of the ink portion 14, but the light irradiation direction can be optionally changed. Although the first direction of the first collation and the second direction of the second collation do not necessarily have to be vertical, for example, it is suitably that the first and second registered images may be vertical from the viewpoint of the degree of deviation, the ease of understanding for the user, or the operability. Further, the first direction and the second direction on a plane may be set in accordance with the model of the collation image photographing machine 22. For example, in a model A, the first direction on a plane is set to the lower side of the ink portion 14, the second direction on a plane is set to the left side of the ink portion 14, in a model B, the first direction is set to the right side of the ink portion 14, the second direction is set to the lower side of the ink portion 14, or the like. The processor 22*c* determines the first direction and the second direction for each model according to a program.

In the modified example, the collation accuracy is improved by performing the collation twice in total, but the collation may be performed three times or more as needed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A collation device comprising:
a light source unit;
a camera unit that receives light emitted from the light source unit and reflected in a collation area of an object to acquire a photographed image of the collation area;
a display unit; and
a processor configured to, by executing a program:
display a guide of a bright spot portion of the light source unit on the photographed image on the display unit to notify a user to align a position of the bright spot portion reflected on the photographed image with a position of the guide by adjusting an elevation angle of the collation device so that an angle formed by the light source unit, the camera unit, and the collation area of the object is at predetermined angle.

2. The collation device according to claim 1, wherein the processor is configured to:
determine whether or not the angle formed by the light source unit, the camera unit, and the collation area of the object matches the predetermined angle, and display a determination result on the display unit.

3. The collation device according to claim 2, wherein the processor is configured to:
display a guide or a message that guides a user in a direction in which the angle formed by the light source unit, the camera unit, and the collation area of the object matches the predetermined angle on the display unit, in a case where the angle does not match the predetermined angle.

4. The collation device according to claim 1, wherein the processor is configured to:
display the guide so that a direction of the light emitted from the light source unit on a plane is a direction different for each of a plurality of collations.

5. The collation device according to claim 4, wherein the processor is configured to:
display the guide so that the direction of the light emitted from the light source unit on a plane is different by 90 degrees between a first collation and a second collation.

6. A collation device comprising:
a light source unit;
a camera unit that receives light emitted from the light source unit and reflected in a collation area of an object to acquire a photographed image of the collation area;
a display unit; and
a processor configured to, by executing a program:
display a guide comprising a message indicating a direction in which an elevation angle of the collation device should be adjusted that changes in accordance with a change in an angle of the light source unit on the display unit so that an angle formed by the light source unit, the camera unit, and the collation area of the object is at predetermined angle.

7. The collation device according to claim 6, wherein the processor is configured to:
determine whether or not the angle formed by the light source unit, the camera unit, and the collation area of the object matches the predetermined angle, and display a determination result on the display unit.

8. The collation device according to claim 7, wherein the processor is configured to:
display a guide or a message that guides a user in a direction in which the angle formed by the light source unit, the camera unit, and the collation area of the object matches the predetermined angle on the display unit, in a case where the angle does not match the predetermined angle.

9. The collation device according to claim 6, wherein the processor is configured to:
display the guide so that a direction of the light emitted from the light source unit on a plane is a direction different for each of a plurality of collations.

10. The collation device according to claim 9, wherein the processor is configured to:
display the guide so that the direction of the light emitted from the light source unit on a plane is different by 90 degrees between a first collation and a second collation.

11. A collation device comprising:
a light source unit;
a camera unit that receives light emitted from the light source unit and reflected in a collation area of an object to acquire a photographed image of the collation area;
a display unit; and
a processor configured to, by executing a program:
display a guide indicating a state of at least one of a color or a pattern of the collation area under a predetermined angle on the display unit so that an angle formed by the light source unit, the camera unit, and the collation area of the object is at the predetermined angle, wherein the color or the pattern of the collation area changes in accordance with a change in an angle of the light source unit.

12. The collation device according to claim 11, wherein the processor is configured to:
determine whether or not the angle formed by the light source unit, the camera unit, and the collation area of the object matches the predetermined angle, and display a determination result on the display unit.

13. The collation device according to claim 12, wherein the processor is configured to:
display a guide or a message that guides a user in a direction in which the angle formed by the light source unit, the camera unit, and the collation area of the object matches the predetermined angle on the display unit, in a case where the angle does not match the predetermined angle.

14. The collation device according to claim 11, wherein the processor is configured to:
display the guide so that a direction of the light emitted from the light source unit on a plane is a direction different for each of a plurality of collations.

15. The collation device according to claim 14, wherein the processor is configured to:
   display the guide so that the direction of the light emitted from the light source unit on a plane is different by 90 degrees between a first collation and a second collation.

* * * * *